US006882714B2

(12) United States Patent
Mansfield (10) Patent No.: US 6,882,714 B2
(45) Date of Patent: Apr. 19, 2005

(54) UNIVERSAL CALL-LOG SYSTEM AND METHOD FOR A HOME NETWORK TELEPHONE

(75) Inventor: Carl Mansfield, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 149 days.

(21) Appl. No.: 10/112,909

(22) Filed: Mar. 27, 2002

(65) Prior Publication Data

US 2003/0185365 A1 Oct. 2, 2003

(51) Int. Cl.⁷ .......................... H04M 1/56; H04M 15/06
(52) U.S. Cl. .......................... 379/142.14; 379/142.01; 379/142.15; 379/142.17; 379/157; 379/198
(58) Field of Search ...................... 379/142.01, 142.04, 379/142.07, 142.12, 142.13, 142.14, 142.15, 142.17, 156, 157, 158, 161, 165, 167.01, 171, 172, 173, 177, 182, 188, 198

(56) References Cited

U.S. PATENT DOCUMENTS 5,023,868 A * 6/1991 Davidson et al. ........... 370/270
5,396,548 A * 3/1995 Bayerl et al. ............... 379/140
5,838,777 A * 11/1998 Chang et al. ............... 379/352
6,134,308 A * 10/2000 Fallon et al. ........... 379/142.06
2002/0076022 A1 * 6/2002 Bedingfield ............ 379/142.01
2003/0041030 A1 * 2/2003 Mansfield ..................... 705/50
2003/0142795 A1 * 7/2003 Gavette et al. ............ 379/67.1

* cited by examiner

Primary Examiner—Quoc Tran
(74) Attorney, Agent, or Firm—David C. Ripma; Matthew D. Rabdau; Joseph P. Curtin (57) ABSTRACT

A system and method are provided for maintaining a universal call-log in a Home Network telephone system. The method comprises: transceiving calls on at least one external telephone line; bridging calls to a plurality Home Network endpoints; and, logging the bridged calls. Bridging calls to a plurality Home Network endpoints includes initiating an outgoing call from an endpoint. Then, the outgoing calls initiated from endpoints are logged. Likewise, incoming calls received on an external telephone line addressed to an endpoint and bridged, and logged. Logging the bridged calls includes cross-referencing entries such as call time, the call duration, the type of call, the external telephone involved, the external line telephone number from which an incoming call is received, the external telephone line telephone number to which an outgoing call is addressed, the endpoint to which an incoming call is addressed, and the endpoint initiating an outgoing call.

52 Claims, 5 Drawing Sheets

CALL-LOG

| ENTRY # | ENTRY |
|---|---|
| 1 | NEWEST |
| 2 | NEXT NEWEST |
| ⋮ | |
| n | OLDEST |

UNIVERSAL CALL-LOG SYSTEM AND METHOD FOR A HOME NETWORK TELEPHONE

BACKGROUND OF THE INVENTION

1. Field of the Invention

This invention generally relates to Home Network telephony and, more particularly, to a system and method for managing a universal call-log for a Home Network telephone system.

2. Description of the Related Art

Several conventional residential and small office home office (SOHO) telephones are able to log the calls that are made (originated), as well as incoming calls that are either answered or missed. In the latter case, this call-log is only useful if calling line ID (CLID) is supported since, without CLID, the call-log cannot identify the number of the caller. Often, call-logs are cross-referenced with phonebook entries, so that the call-log can show a more meaningful ASCII name, herein referred to as a descriptor, to identify the caller, rather than just the number. Likewise, a number in a call-log can typically be saved directly into a phonebook, with the user only needing to type the ASCII name.

Some of the problem with the conventional call-logs are:

phones have a somewhat limited memory space for call-log entries, typically between 30 and 100 numbers incoming and one number dialed;

if the user has many phones in the home, the call-log is not necessarily available on every phone, for example, dialed numbers on one phone are not available on another phone;

call-logs are typically stored in less-costly volatile memories, which results in them being lost forever if the power fails. This is a problem especially for cordless handsets, since they are battery powered and frequently lose power, depending on the user's habits; and, it is typically impossible to print the call-log (hardcopy), unless the telephone has an integrated fax device.

Conventional multi-handset telephony products can store phonebooks and call lists in both the base unit and the handsets. However, the phone books and call logs in each handset and the base unit are distinct and locally stored, although some systems support the capability to copy entries from one part of the system to another.

It would be advantageous if a call-log could be centrally maintained for a Home Network telephone system.

It would be advantageous if the central call-log could be maintained despite power outages or handheld device battery failure.

It would be advantageous if the call-log could be shared and accessed by all the endpoint in the Home Network telephone system.

SUMMARY OF THE INVENTION

The present invention discloses a single, universal call-log for the home, which can be accessed by any of the telephony devices in a Home Network. To implement the call-log, additional voice over Home Network (VoHN) protocol is required, to support the necessary out-of-band signaling needed to implement, maintain, and access the universal call-log. The following are functionality enhancements over the above-mentioned conventional systems:

expanded call-log (and phonebook) memory;

simple access and editing of the call-log entries using an input/output (I/O) device (for example, PC keyboard) rather than the numeric keypad of an endpoint (for example, a telephone);

call-logs entries can be printed to hard-copy via the PC and printer;

call-logs are not lost if there is a power failure, or a battery failure in the handheld endpoint device.

The invention is implemented by storing the call-log in a residential gateway (GW), not in the base unit of the cordless endpoint. This present invention system is designed to operate with any potential Home Network technology, not just cordless telephone interfaces (which are optimized for voice). While conventional systems are typically limited to logging no more than 30 numbers, the gateway memory permits a virtually unlimited amount of numbers to be logged.

Accordingly, a method is provided for maintaining a universal call-log in a Home Network telephone system. The method comprises: transceiving calls on at least one external telephone line; bridging calls to a plurality Home Network endpoints; and, logging the bridged calls.

Bridging calls to a plurality Home Network endpoints includes initiating an outgoing call from an endpoint. Then, the outgoing calls initiated from endpoints are logged. Likewise, incoming calls received on an external telephone line addressed to an endpoint are bridged and logged.

Logging the bridged calls includes cross-referencing entries such as call time, the call duration, the type of call, the external telephone line telephone number from which an incoming call is received, the external telephone line involved in the call, the external telephone number to which an outgoing call is addressed, the endpoint to which an incoming call is addressed, and the endpoint initiating an outgoing call.

The method further comprises establishing a gateway for transceiving calls. The gateway communicates call information on the external telephone line in a first format and converts between the first format and a digital Home Network format. Then, bridging calls to the plurality of Home Network endpoints includes using the gateway to establish traffic channels to communicate information to the endpoints in the Home Network format, and to establish a control channel for managing the universal call-log. Further, establishing the gateway includes logging calls at the gateway and storing a universal call-log at the gateway.

Additional details of the above-described method, and a Home Network telephone system for managing a call-log are presented in greater detail below.

DETAILED DESCRIPTION OF THE PREFERRED EMBODIMENTS

Figure 1:
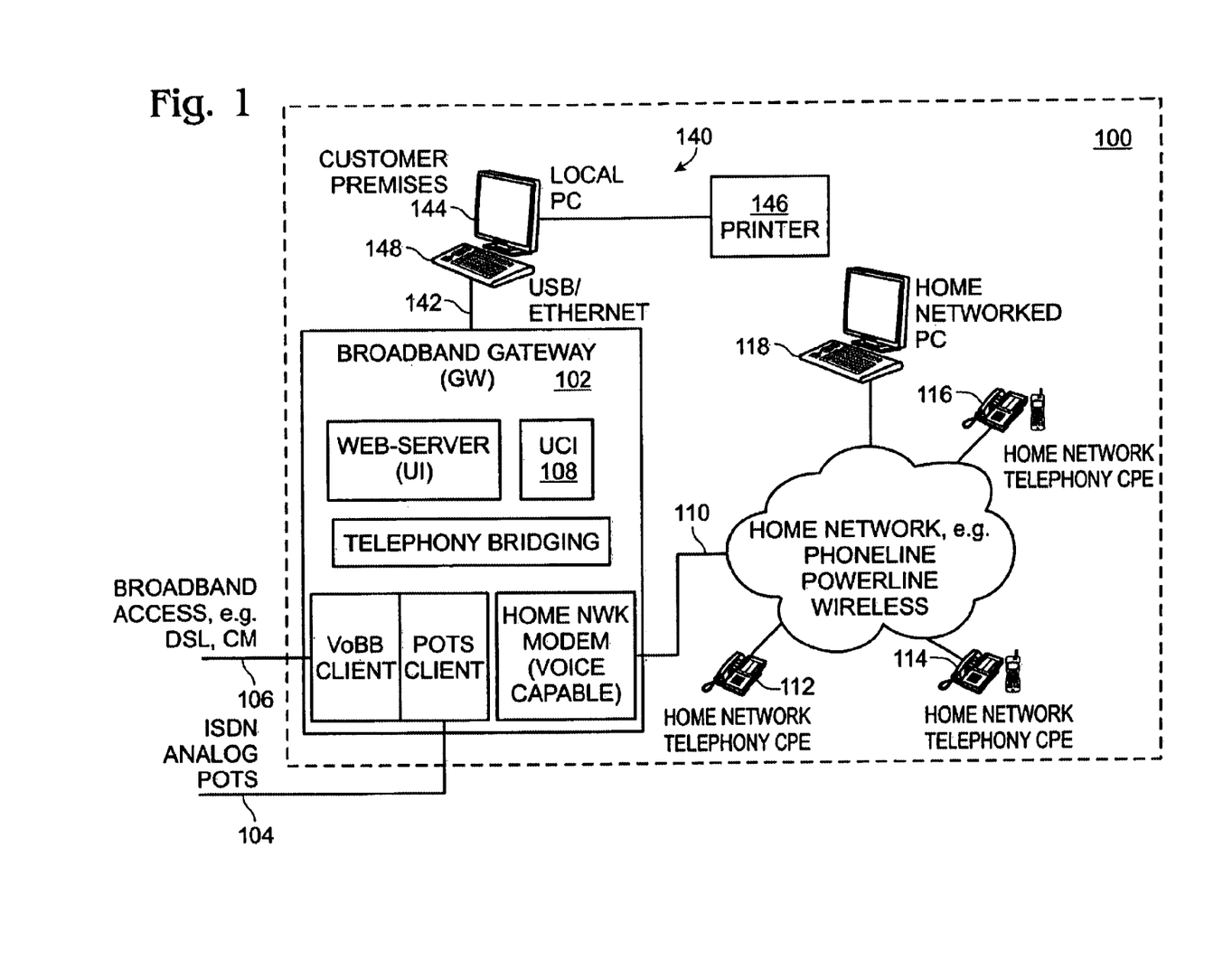
FIG. 1 is a schematic block diagram of the present invention Home Network telephone system for maintaining a universal call-log.

FIG. 1 is a schematic block diagram of the present invention system for maintaining a universal call-log in a Home Network telephone system. The universal phonebook system 100 comprises a gateway (GW), or broadband gateway 102 having an input to transceive calls on external communication medium. The gateway 102 transceives calls on external communication medium that communicate call information in a first format that generally includes voice over broadband (VoBB) and legacy services. VoBB is defined herein to be voice over cable modem (VoCM), voice over DSL (VoDSL), voice over Internet protocol (VoIP), fixed wireless access (FWA), or fibre to the home (FTTH), and voice over ATM (VoATM). The legacy services are the integrated service digital network (ISDN) and plain old telephone service (POTS). The external line 104 is for POTS and ISDN service and line 106 is for VoBB. The present invention is not limited to any particular number of lines or specific telephone services. The gateway 102 acts as a communications bridge between the external lines 104 and 106, and a Home Network port on line 110. Line 110 represents transmission medium such as wireless, convention telephone line, AC powerline, and dedicated hardline connections. For brevity, the Home Network transmission medium will be referred to hereafter as line 110.

In some aspects, the system 100 permits a fallback to basic line-powered, legacy analog POTS operation. This support for "lifeline" telephony provides access to telephone service in the case of power failure, or broadband service failure. Note that if the gateway 102 integrates DSL as the broadband access, the POTS service can enter the gateway 102 via the same physical connector as the VoBB service, in which case lines 104 and 106 are the same. Otherwise, an additional jack for incoming POTS is required (as shown). Likewise, an additional jack for ISDN services may be supported. Thus, the gateway 102 can implement an analog POTS client and voice over broadband clients. This allows the gateway 102 to answer an analog call or broadband network call, and bridge this to voice over Home Network (VoHN) service inside the home.

The gateway 102 acts as a router/firewall between the broadband access connection to the ISP and Internet and in-home data devices on the Home Network. The Home Network technology is also capable of transmitting high-quality voice traffic. The system 100 uses protocol enhancement on top of the basic Home Network technology, which is referred to herein as VoHN protocol. For example, the home phoneline network alliance (HomePNA) system uses Voice over HomePNA (VoHPNA) to support voice traffic.

The gateway 102 is able to bridge telephony between the external line telephone service on the access system (including VoBB, POTS, and ISDN) and the VoHN transport in the Home Network. This allows the endpoint communication devices, typically referred to as endpoints, to access the VoBB services to make and receive VoBB telephone calls, even though they do not implement a VoBB client directly.

A universal call-log (UCL) 108 logs the calls bridged between the gateway 102 and the endpoints 112–118. Typically the endpoint devices are telephones, but they can also be fax machines, multifunction peripherals (MFPs), videotelephones, or computers. Generally, wireless or hardwired devices, regardless of their function, can be connected in the system 100 as endpoints. Although four endpoints are depicted, the present invention system 100 is not limited to any particular number of endpoints. The call-log typically resides in the gateway 102, however, it can also reside in an independent memory (not shown) in communication with the gateway 102.

When, an endpoint, for example endpoint 112, initiates an outgoing call bridged to an external telephone line on line 104 (or line 106) through the gateway 102, the call-log 108 logs the outgoing calls initiated from the endpoint. Likewise, when the gateway 102 bridges an incoming call received on an external telephone line 104/106 addressed to an endpoint, for example endpoint 112, the call-log 108 logs the incoming call. Calls initiated by one endpoint to another endpoint in the system 100 can also be logged.

The call-log 108 is a universal call-log (UCL) that cross-references entries such as the call time, the call duration, the type of call, the external telephone line involved in the call, the telephone number from which an incoming call is received, the telephone number to which an outgoing call is addressed, the endpoint(s) to which an incoming call is addressed, and the endpoint initiating an outgoing call. As mentioned above, the call-log 108 is typically an integral part of the gateway 102, forming a centralized universal call-log to maintain entries for each endpoint. In some aspects of the system, the gateway 102 includes a nonvolatile memory and the call-log 108 resides in the gateway nonvolatile memory.

The gateway 102 communicates call information on the external telephone line 104/106 in a first format, converts between the first format and a digital Home Network format, establishes traffic channels to communicate information to the endpoints in the Home Network format, and establishes a control channel for managing the universal call-log.

Typically, the gateway receives calling line ID (CLID) information on the external telephone lines 104/106 to identify the telephone number of calling parties. Then, the call-log 108 logs the telephone numbers of calling parties in response to the gateway receiving the calling line ID information. Likewise, the gateway 102 has a record of the dialed numbers for every outgoing call that is made, since the gateway receives the external dialed digits from the calling endpoint as part of the process of establishing an outgoing call.

It is another feature of the system 100 that the endpoints 112–118 communicate with the gateway 102 to access the universal call-log 108. The call-log 108 cross-references call-log entries to endpoint actions such as answering a call addressed to an endpoint, not answering (missing) a call addressed to an endpoint, and dialing a call from an endpoint.

For example, the gateway 102 attempts to bridge an incoming call received on an external telephone line 104/106 by ringing the addressed endpoint, for example endpoint 112. The call-log cross-references call-log entries to the addressed endpoint, for example endpoint 112. When the endpoint 112 answers a call in response to the gateway ringing that endpoint, the call-log 108 cross-references the related call-log entry to the addressed endpoint that answered the call, in this case the endpoint 112, and indicated the call type as "Answered". When the endpoint does not answer a call in response to the gateway ringing that endpoint, the call-log 108 cross-references the related call-log entry to the addressed endpoint, in this case endpoint 112, indicating the call type as "Missed" or "Not Answered".

In some circumstances the gateway 102 attempts to bridge an incoming call received on an external telephone line 104/106 by ringing a plurality of endpoints, such as a first and second endpoint. For example, the first and second endpoints can be two extension phones 112 and 114 addressed by the same telephone number. In this example the first endpoint 112 answers the call in response to the gateway ringing, but the second endpoint 114 does not answer the call. Then, the call-log 108 cross-references call-log entries to the first endpoint 112 answering the call and the second endpoint 114 not answering the call.

Figure 2:
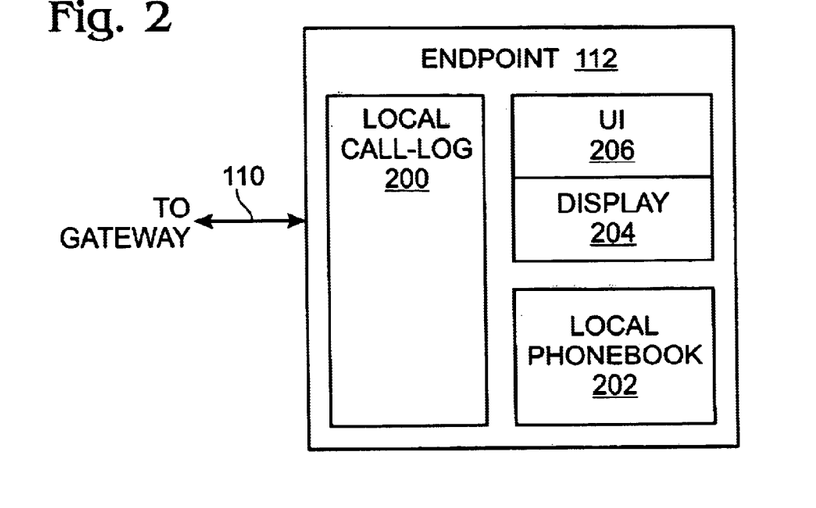
FIG. 2 is a schematic block diagram of the endpoint from FIG. 1 in greater detail.

FIG. 2 is a schematic block diagram of the endpoint 112 from FIG. 1 in greater detail. The (first) endpoint 112 is representative of the other endpoints 114–118 in the system.

The endpoint includes a local call-log 200 that can be used in the event that the universal call-log (108, see FIG. 1) cannot be accessed via line 110. Alternately, the user may be permitted to manually select between the universal call-log and the local call-log, even at times when the universal call-log is available.

Returning to FIG. 1, the system 100 further comprises an input/output (I/O) device 140 having a port connected to the gateway 102 on line 142 for accessing and downloading (a copy of) the universal call-log 108, or portions of the call-log 108. The I/O device 140 can be a personal computer (PC) or a web browser to interface with a gateway web server. The connection to gateway can be a USB, parallel port, or Ethernet connection, to name a few possibilities. In other aspects of the system, the I/O device can be a computer endpoint, such as endpoint 118, which accesses the universal call-log in the gateway via a port on the Home Network 110. An I/O device interface, such as a display 144 or a printer 146, has a port connected to the I/O device 140 for displaying the downloaded call-log.

The I/O device 140 has a user interface to accept user commands. The interface can be a keyboard 148 or an application to process audio commands, to name a couple of examples. The I/O device 140 supplies the user commands in communications with call-log 108. In turn, the call-log 108 accepts the user commands from the I/O device 140 and displays or edits entries in the universal call-log 108 in response to the user commands. Typically, the editing of the UCL involves deleting or resetting entries, although it would also be possible to modify existing entries in the call-log.

In some aspects of the system 100, the I/O device 140 has a memory (not shown) for saving a copy of the downloaded call-log. In other aspects, the I/O device 140 supplies user commands to query the size of the call-log 108, and the call-log 108 supplies a call-log size to the I/O device 140 in response to the query. The call-log size can be measured as the number of entries in the call-log or the total number of bytes residing in the call-log (the number of bytes in the call-log entries).

In some aspects of the system 100, the I/O device 140 includes a statistics application (not shown). The I/O device 140 uses the statistics application to analyze the downloaded universal call-log. The call-log entries can be analyzed to create statistical summaries for the total number of calls, the average call length, and rankings by call length, to name but a few possible examples.

Figure 3:
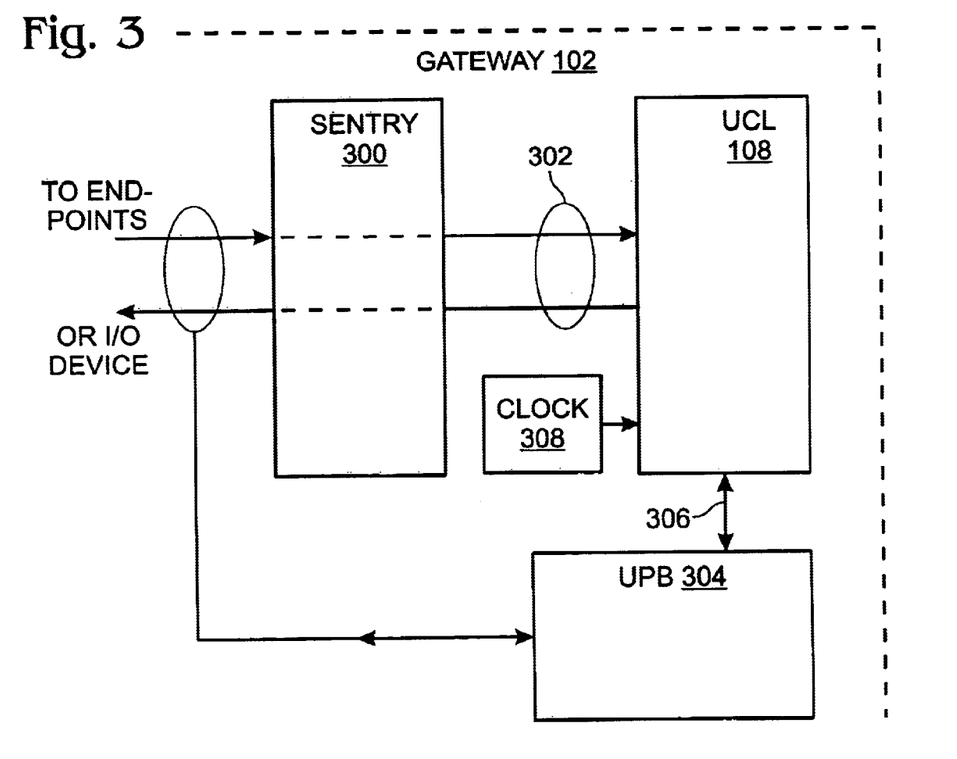
FIG. 3 is a schematic block diagram illustrating the sentry feature of the system.

FIG. 3 is a schematic block diagram illustrating the sentry feature of the system. In some aspects, the gateway 102 further includes a sentry circuit 300 having a port connected to the call-log on line 302. The sentry circuit 300 establishes a call-log security protocol to enable access the universal call-log 108. The sentry circuit 300 blocks access to the universal call-log 108 until the security protocol is passed. The security protocol could require a communication endpoint or I/O device to submit a password, or some other indicator that access should be permitted. The sentry circuit 300 can be a hardware block, but is more likely to be enabled as a software application.

In some aspects of the system, the gateway 102 further includes a phonebook, or universal phonebook (UPB) 304 having a port on line 306 to supply descriptors cross-referenced to external telephone line telephone numbers. The call-log 108 accesses the phonebook 304 and identifies universal call-log entries using descriptors from the phonebook 304. Using the phonebook entries, the call-log 108 can identify endpoint entries in the call-log with a descriptor, such as a full name, a nickname, a location, or a purpose (for example, "work" phone). The phonebook is also accessible from the endpoints and the input/output (I/O) device connected to the gateway 102. In some aspects of the system not shown in FIG. 3, the endpoints and/or I/O device must access the UPB via the sentry 300.

Returning to FIG. 2, each endpoint also includes a local phonebook 202 that cross-references descriptors to external telephone line telephone numbers. Both the local phonebook 202 and the local call-log 200 are accessible to the host endpoint in the event that the endpoint cannot access the universal phonebook or universal call-log in the gateway, or if the user manually selects to use either the local call-log or local phonebook.

Figure 4:
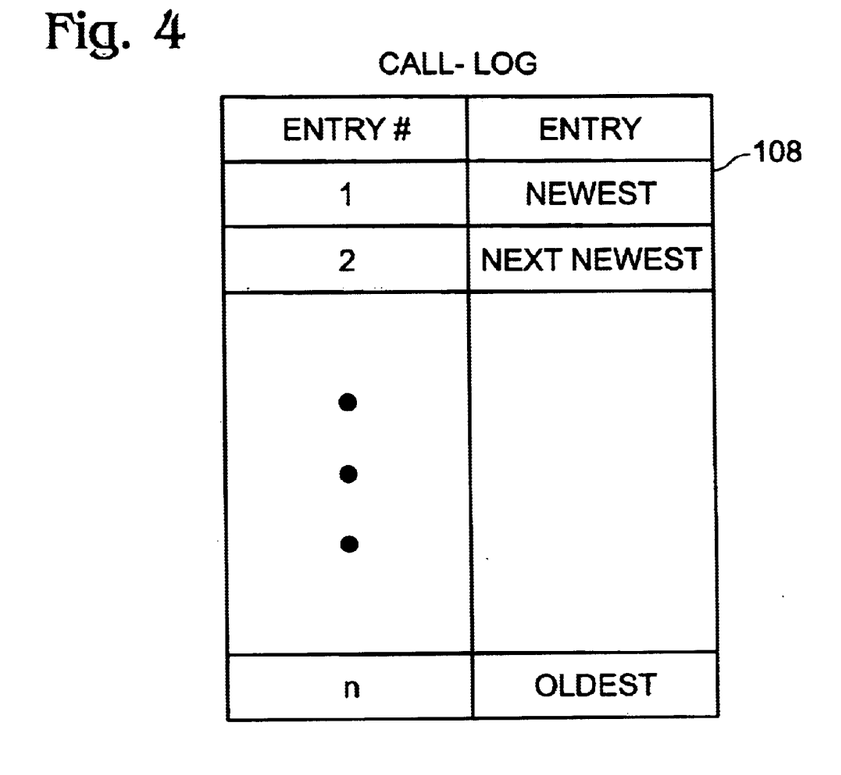
FIG. 4 is a diagram illustrating a call-log with a predetermined number of possible entries.

FIG. 4 is a diagram illustrating a call-log 108 with a predetermined number of possible entries. The call-log 108 can be formed with a predetermined fixed number of entries. As mentioned above, the data in an entry can include the time a call was initiated (or received), the call type, the call duration, the telephone number initiating (or receiving) the call, or the endpoint receiving (or initiating) the call. As shown, the fixed number is equal to n. The call-log 108 overwrites the older entries with newer entries when the call-log 108 entries exceed the fixed number n. For example, the next-to-oldest entry overwrites the oldest entry. In some aspects of the invention, however, the number n is so large that the older entries in the call-log will never realistically be overwritten. In other aspects, the number n increases to match to total number of entries.

Returning to FIG. 3, in some aspects of the system, the gateway further includes a clock 308 for referencing a predetermined time threshold. Then, the call-log 108 discards entries in the universal call-log older than the time threshold. For example, if the threshold is set to 30-days, all entries in the call-log 108 older than 30-days are discarded.

Figure 5:
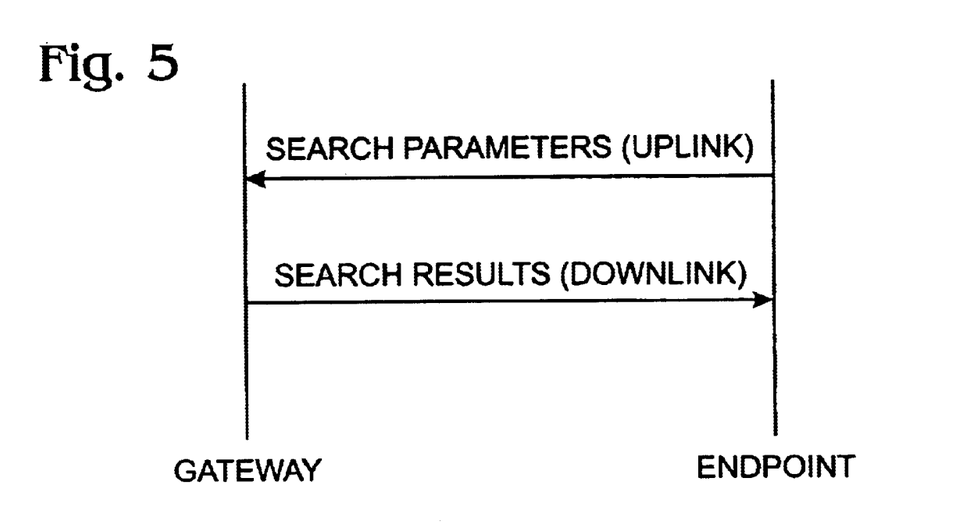
FIG. 5 is a diagram illustrating control channel communications between the gateway and an endpoint.

FIG. 5 is a diagram illustrating control channel communications between the gateway and an endpoint. The gateway establishes an out-of-band control channel between the gateway and each endpoint to which a call is bridged. The endpoint accesses the universal call-log by communicating an uplink out-of-band message to the gateway specifying universal call-log search parameters. The gateway communicates a downlink out-of-band message to the endpoint returning the results of the universal call-log search.

For example, the endpoint communicates an uplink out-of-band message to the gateway specifying universal call-log entry parameters. The entry can be calls made to the first endpoint or calls originated by the second endpoint. The gateway communicates a downlink out-of-band message to the endpoint that returns at least one call-log entry cross-referenced to the selected search parameter, unless there are no entries in the call-log or no entries that match the search criteria. For example, in response to the query, "list calls addressed to the first endpoint?", the response might be the entry "4". Of course, additional associated entries can be returned with the number 4, such as the time of day the calls were received, the date of the calls, or the length of the calls, to name but a few possible entries.

When an endpoint transmits an out-of-band message to the gateway requesting universal call-log (UCL) entries, information is also sent related to the endpoint's memory capacity, and the gateway returns a list of entries constrained it fit in the endpoint's memory capacity. That is, the returned list is tailored to "fit" in the endpoint's memory. In another aspect of the system, the endpoint may communicate memory capacity information, prior to a request to access the UCL, using a separate out-of-band message.

In creating UCL search parameters, the user can enter the name or the telephone number for an entry they are seeking, using the alphabetic entry capabilities of the numeric keypad on the endpoint. The user can enter the whole name, only the first few characters, or a subset of the name related to the sought telephone number.

For example, a user can search for calls involving "Dave Smith" by only entering "Smi". When either the user presses a key to send the search string, or the endpoint communications device determines that enough characters have been entered (the device can be set to automatically send the string after 3 or 4 characters are entered, to speed the process), the device sends an out-of-band message to the gateway requesting a search of the universal call-log. In this request message, the search string and the maximum number of entries ("Max") to retrieve are returned. The parameter "Max" is needed to avoid the endpoint communications device memory capacity limitations.

The gateway (GW) searches the database to find all the entries that match. The gateway searches in an intelligent way that allows Dave Smith's number to be located even if it were stored as "Smith, Dave", or "Dave Smith", or any other logical combination. The GW returns the found entry in another out-of-band message to the endpoint. This message shows the number of matches and lists then.

If the GW finds more matching entries than the endpoint can accept, it will not be able to return all of the matching entries. In such a case, the GW can select which of the entries to return in some arbitrary manner, and may also indicate to the endpoint that more entries exist than could be returned. This information may be indicated to the user on the display of the endpoint so that they are not surprised if an expected entry is not found. In such a case, the user would need to re-enter their search with more specific search string, or resort to scrolling the UCL.

The retrieved entries are displayed to the user at the endpoint. The user can easily scroll through the retrieved list and select the desired entry. Alternately, the first endpoint communications device transmits one entry character per out-of-band message and the gateway refines the full descriptor search results in response to the number of characters in the search parameter. For example, in response to entering the character "S", the gateway returns entries beginning with "S", in response to entering the second character "m", the gateway returns names beginning with "Sm". ", in response to entering the third character "i", the gateway returns names beginning with "Smi".

As an alternative mechanism, the user may open the UCL for remote scrolling. To do this, the user simply opens the UCL from an endpoint for scrolling, and manually scrolls through the entire list in alphabetic or numeric order, until the user reaches the desired entry. As the user scrolls, the gateway transfers portions of the UCL to the endpoint in one or more out-of-band signaling messages for display on the user interface of the endpoint device.

The scrolling mechanism operates as follows:

1. The User opens the universal call-log. Typically, when opened the starting point of the call-log entries could be at the most recently logged entry. Alternatively, the user could use the UI of the endpoint to indicate opening the call-log at some other point, for example the calls logged starting last Thursday.

2. An out-of-band message is sent to the GW requesting a list of entries to be returned to allow scrolling. This message indicates the location where the numbers should be centered around, and the total number of entries to be returned. For example, if the location is Mar. 18, 2002 08:00 and Max is 20, 20 entries located at the logging date and time of Mar. 3-18, 2002 08:00 are requested.

3. Based on the requested location, the GW returns Max entries to the endpoint, centered at the requested location. For example, if the requested location is Mar. 3-18-2002 08:00, and max=21, the GW will return the 10 entries most close in time to, and logged immediately before Mar. 3-18, 2002 08:00, and the first eleven entries most close in time to, and logged immediately after Mar. 3-18, 2002 at 08:00.

4. The user can scroll up and down through the subset of the universal call-log entries that they have been given. Typically, the endpoint displays more than one entry at a time. For example, a 3-line LCD might show the previous, current and next entries.

5. If the user scrolls too near to the end of the set of call-log entries that is stored in RAM, it is necessary to download another set of entries from the GW, so that the scrolling can continue. This can be triggered in one of three ways:
   i) When the user is within N entries of the edge of the current list, a new list is requested centered at the current point. N is independent of Max.
   ii) When the user is within a certain fraction of Max of the edge of the current list, a new list is requested centered at the current point. For example, this might trigger if the user gets within Max/5 of the current edge of the list.
   iii) When the user reaches the edge of the current list and tries to scroll to the next item that has not yet been sent by the GW, a new list is requested.
   One of the first two approaches is desirable, since the delay perceptible to the user will be smaller. Also, the third approach does not allow the LCD to display previous, current and next entries on the phone LCD when the edge of the list is approached.

6. When the trigger point is reached, the endpoint sends a new request for call-log entries, using an out-of-band signaling message, which returns them in the same manner as before. The new request specifies a list that is centered around the new current location. The new list can effectively replace the old list stored in volatile memory in the endpoint. Therefore, only a small amount of memory space is required at the endpoint in order to scroll through the entire UCL.

7. Steps 4–7 can repeat, potentially indefinitely, until the user locates the entry they are seeking. Once that entry is found, the user can dial it with a single key press.

In other aspects of the system, the Steps 1–7 can be used to retrieve and present call-log entries in alphabetical order of the called or calling party.

A call-log will typically store entries such as "Date/Time", "Phone number", "call type", and "call duration". Table 1 exemplifies one possible list of entries in a call-log. Call Type typically indicates one of three options: 1) dialed (originating) calls; 2) answered calls; 3) missed calls.

TABLE 1

| Date/Time | Number | External Line Used | Call Type | Duration |
|---|---|---|---|---|
| Aug. 12, 2001 23:15:03 | 3607778987 | Office (VoBB) | Dialed | 11:21 |
| Aug. 13, 2001 08:12:03 | 5672337233 | Office (VoBB) | Missed | 0 |
| Aug. 13, 2001 09:45:53 | 8008887463 | Personal (POTS) | Answered | 5:03 |

Table 2 illustrates another exemplary call-log. The universal call-log stores "Time", "Number", "Endpoint", "Call type", "Duration". Here, "Endpoint" simply indicates all the endpoints that are involved with the call. Typically, only one endpoint is involved in a dialed call, but more than one can be involved in an incoming or answered call. "Duration" indicates the length of the call, if applicable.

TABLE 2

| Date/Time | Number | Endpoint | Call Type | Duration |
|---|---|---|---|---|
| Aug. 12, 2001 23:15:03 | 3607778987 | 1, 2 | Missed | 0 |
| Aug. 13, 2001 08:12:03 | 5672337233 | 2 | Missed | 0 |
| Aug. 13, 2001 09:45:53 | 8008887463 | 4 | Dialed | 5:03 |
| Aug. 13, 2001 10:42:12 | 3607778987 | 2, 1 | Answered | 22:21 |

In the case of the last entry in Table 2, the call was answered by endpoint #2. The fact that two endpoints are listed, indicates that two were ringing for the call. The listing of endpoint 2 as the first entry indicates it was the endpoint that answered the call.

Each entry in the log has a Date/Time stamp, the dialed number (which can readily be used to get an associated name, from the UPB), the endpoints that were involved, the external lines used, the type of call, and the call duration. If an answered call involved more than one endpoint, the table indicates which endpoint actually answered the call, for example by listing this endpoint first in the list of associated endpoints.

This list is created entirely automatically, without direct user intervention. Using the web-browser (I/O device) interface from a PC in the home, a user can view and print the list. They can also delete the list or copy any number from it to the phonebook, where they will have to add a meaningful descriptor to be associated with the number, using the PC keyboard. This can be done by basic cut and paste, or done in a more automatic way, for example clicking the number initiates an "add-to-phonebook" process.

From a web-browser interface, the user can view the entire list by time, number, name, call-type or involved endpoints. Of course, the interface will display the ASCII name for each number, by cross-referencing numbers to descriptors in the phonebook. They can also choose to look only at portions of the call-log filtered by some user selected criteria, For example, the user can choose to display only calls that were missed, or only calls made by endpoint 1, or only calls that used the external POTS line, etc. The browser interface also provides some statistical summary data for the call log, including figures such as: total calls; average call length; longest call; etc.

Finally, the user can configure the management of the call list operate as either: 1) entries older than a threshold are discarded; 2) the list size is fixed (size specified by user) and new entries overwrite old entries once the list is full. Optionally, the user can turn on/off criteria that control the logging process. For example, the logging process of outgoing calls can be turned off. As another example, the logging of calls made on a particular external line can be turned off.

Communications between the I/O device and the gateway are conducted in a manner equivalent to the communications between the gateway and an endpoint mentioned above in the description of FIG. 5. In the interest of brevity, it can be assumed that the details of using an I/O device to submit a search parameter to access the call-log are essentially the same as accessing the call-log from an endpoint.

Figure 6A:
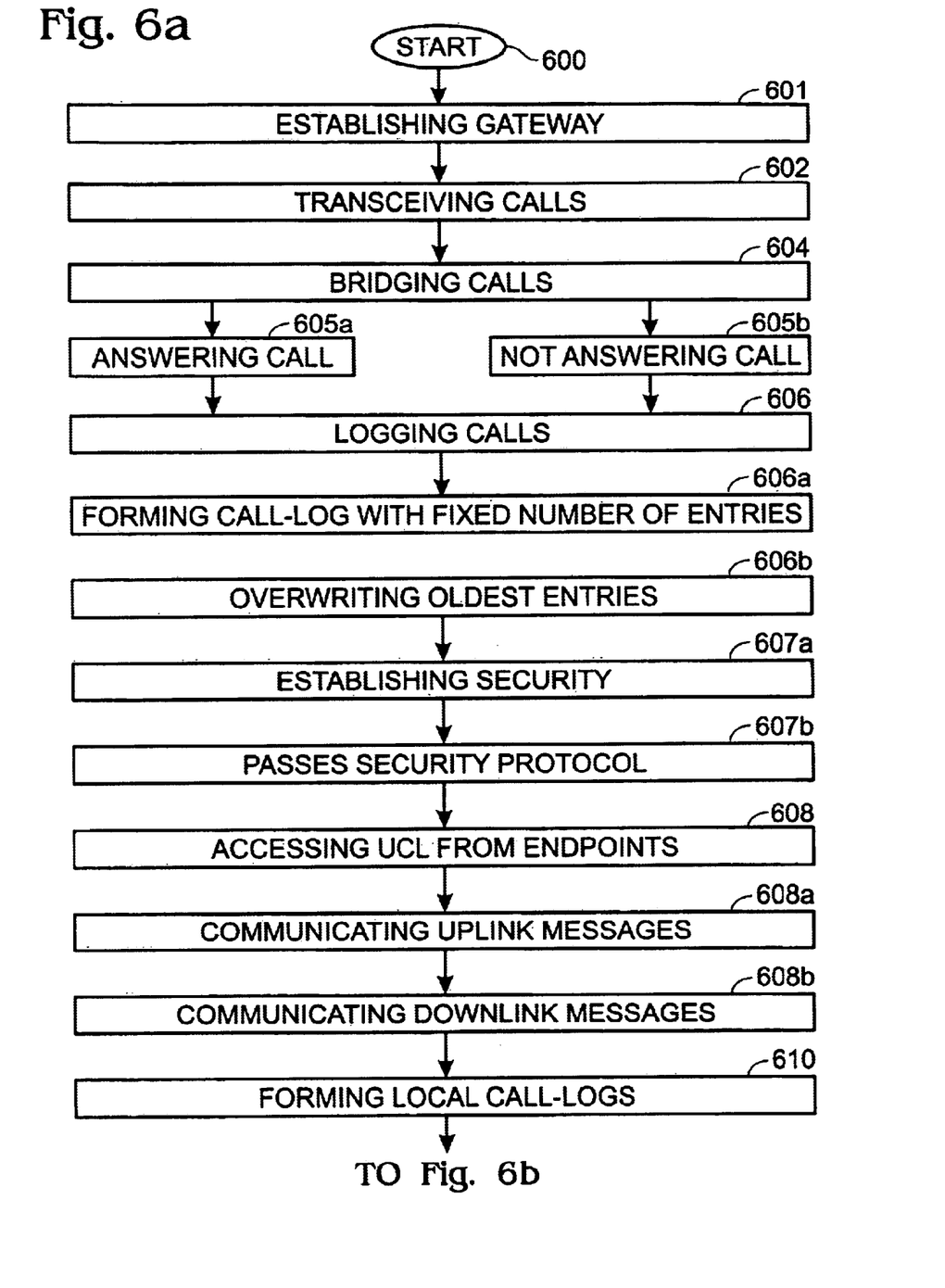
FIGS. 6a and 6b are flowcharts illustrating the present invention method for maintaining a universal call-log in a Home Network telephone system.
Figure 6B:
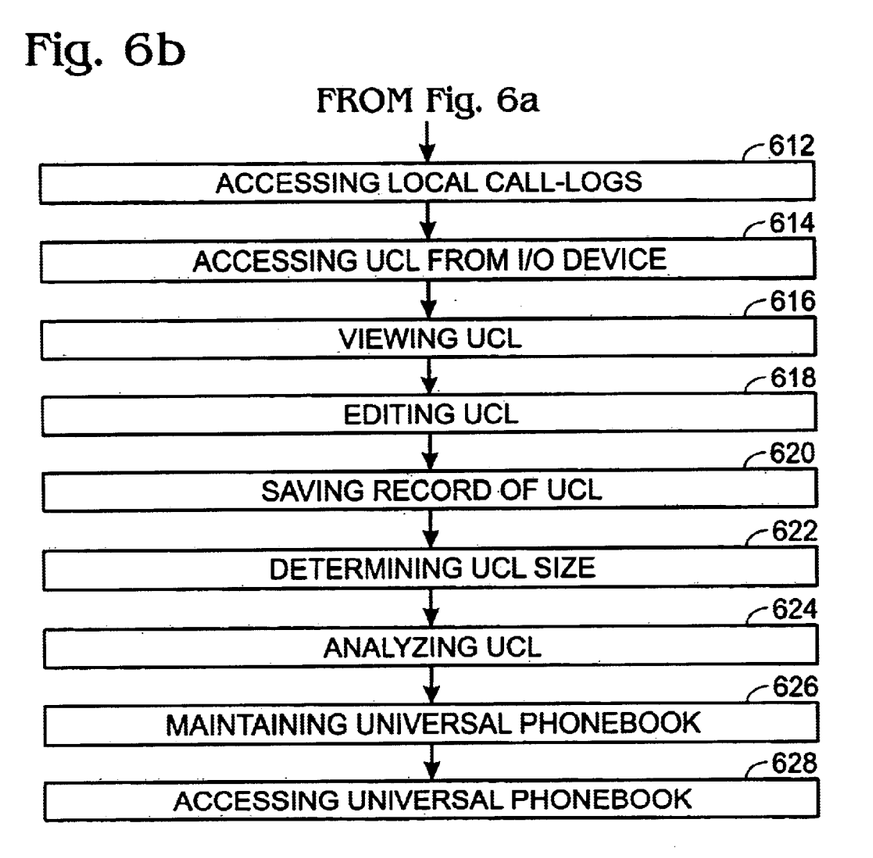

FIGS. 6a and 6b are flowcharts illustrating the present invention method for maintaining a universal call-log in a Home Network telephone system. Although the method is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 600. Step 602 transceives calls on at least one external telephone line. Step 604 bridges calls to a plurality of Home Network endpoints. Step 606 logs the bridged calls. In some aspects of the method a further step, Step 608 accesses the universal call-log from any of the plurality of endpoints.

Bridging calls to a plurality of Home Network endpoints in Step 604 includes initiating an outgoing call from an endpoint. Then, logging the bridged calls in Step 606 includes logging outgoing calls initiated from endpoints. Likewise, bridging calls to a plurality of Home Network endpoints in Step 604 includes bridging incoming calls received on an external telephone line addressed to an endpoint. Then, logging the bridged calls in Step 606 includes logging incoming calls received on the external telephone lines addressed to the endpoints. In some aspects, calls between endpoints are logged.

In some aspects of the method, logging the bridged calls includes forming a universal call-log that cross-references entries such as the call time, the call duration, the type of call, the external telephone line involved, the external telephone number from which an incoming call is received, the external telephone line telephone number to which an outgoing call is addressed, the endpoint(s) to which an incoming call is addressed, and the endpoint initiating an outgoing call.

In some aspects, the method comprises the further step, Step 601, of establishing a gateway. Then, transceiving calls on at least one external telephone line in Step 602 includes using the gateway for communicating call information on the external telephone line in a first format and converting between the first format and a digital Home Network format. Bridging calls to the plurality of Home Network endpoints includes using the gateway for establishing traffic channels to communicate information to the endpoints in the Home Network format and for establishing a control channel to manage the universal call-log.

Establishing a control channel for communications with the universal call-log in Step 602 includes establishing an out-of-band control channel between the gateway and each endpoint to which a call is bridged. Accessing the universal call-log (UCL) from any of the plurality of endpoints in Step 608 includes substeps. Step 608a communicates an uplink out-of-band message from an endpoint to the gateway specifying universal call-log search parameters. Step 608b communicates a downlink out-of-band message from the gateway to the endpoint returning the results of the universal call-log search. In some aspects, communicating a downlink out-of-band message from the gateway to the endpoint in Step 608b includes returning at least one call-log entry cross-referenced to the selected search parameter, if an entry is available that matches the search parameter. In other aspects, communicating uplink and downlink messages in Steps 608a and 608b, respectively, includes iteratively exchanging uplink and downlink out-of-band messages to refine the search. These steps also include using a display and an endpoint local interface to scroll through the cross-referenced entries in response to iterative communications between the endpoint and the gateway.

In some aspects, communicating an out-of-band message in Step 608a, from an endpoint to the gateway, with a search parameter includes communicating a search parameter fragment. Then, communicating an out-of-band message in Step 608b, from the gateway to the endpoint, includes returning universal call-log entries containing the search parameter fragment. In other aspects, communicating an out-of-band message in Step 608a, from the endpoint to the gateway, with a search parameter includes entering one entry character per out-of-band message. Then, communicating an out-of-band message in Step 608b, from the gateway to the endpoint, returning the results of the universal call-log search includes refining the list of entries in response to each received character, and returning the refined list of entries in every out-of-band message.

In some aspects of the method, logging the bridged calls in Step 606 includes using the gateway to form a centralized universal call-log to maintain entries for each endpoint. In other aspects, the universal call-log is formed in nonvolatile gateway memory.

In some aspects, transceiving calls on the at least one external telephone line in Step 602 includes receiving calling line ID (CLID) information to identify the telephone number of calling parties. Then, logging the bridged calls in Step 606 includes logging the telephone numbers of calling parties in response to receiving the calling line ID information.

In some aspects of the method, forming a universal call-log in Step 606 includes logging the type of call from endpoint actions selected from the group including "missed", "answered", and "dialed" calls.

In some aspects, bridging incoming calls in Step 604, received on an external telephone line addressed to an endpoint includes ringing a plurality of endpoints including a first endpoint and a second endpoint. In Step 605a the call is answered at the first endpoint. In Step 605b the call is not answered at the second endpoint. Then, forming a call-log in Step 606 further includes making an "answered call" entry for the first endpoint and "missed call" entry for the second endpoint.

Some aspects of the method include additional steps. Step 610 forms a local call-log at each endpoint. Step 612 accesses the local call-log in response to manual selection by the user or the inaccessibility of the universal call-log.

Step 614 accesses the universal call-log from an input/output (I/O) device connected to the gateway. Step 616 views the universal call-log using an I/O device interface such as a display or a printer. Step 618 uses the I/O device to edit entries in the universal call-log. Step 620 saves a record of the universal call-log at the I/O device. Step 622 uses the I/O device to determine the size of the call-log, where the size is a measurement of the number of entries or the number of bytes. Step 624, in response to accessing the universal call-log, analyzes the call-log entries to create statistical summaries such as the total number of calls, the average call length, and rankings by call length.

Step 626 maintains a phonebook cross-referencing descriptors to external telephone line telephone numbers. Step 628 accesses the phonebook. Step 630 identifies universal call-log entries using descriptors from the phonebook. Step 632 identifies entries in the call-log representing endpoints with a descriptor. In some aspects, accessing the phonebook in Step 628 includes accessing the phonebook from a source such as an endpoint or an input/output (I/O) device connected to the gateway. In other aspects, maintaining a phonebook cross-referencing descriptors to external telephone line telephone numbers in Step 626 includes maintaining a phonebook at a destination such as a universal phonebook stored at the gateway or a local phonebooks stored at each corresponding endpoint.

In some aspects of the method a further step, Step 607a establishes a call-log security protocol to enable access the universal call-log. Step 607b, prior to accessing to the universal call-log, passes the security protocol.

In some aspects of the method, logging the bridged calls in Step 606 includes substeps. Step 606a forms a universal call-log with a predetermined fixed number of entries. Step 606b overwrites older entries with a newer entry when the call-log entries exceed the fixed number. Alternately, logging the bridged calls includes other substeps. Step 606c (not shown) forms a predetermined time threshold. Step 606d (not shown) discards entries in the universal call-log having an age greater than the time threshold.

A system and method for managing a call-log in a Home Network telephone system has been provided. This invention applies to telephones as well as all other possible communications devices with similar, Home Network architecture, such as a fax, modem, or video telephone. Although examples have been provided for devices that use HomePNA in the home, it is also applicable to other devices that use other Home Networking technologies. Another implementation of the present invention not discussed above could simply store the call-log separately for each endpoint, rather than implementing a universal call-log. However, this approach would not use memory as efficiently. Specific examples have been given as to call-log entry fields and as to how the call-log can be organized. However, many other entry fields and organizations could be equally well described by the invention. Other variations and embodiments of the invention will occur to those skilled in the art.

We claim:

1. In a Home Network telephone system, a method for maintaining a universal call-log, the method comprising:
   establishing a gateway;
   transceiving calls on at least one external telephone line as follows:
      communicating call information on the external telephone line in a first format;
      converting between the first format and a digital Home Network format;
   bridging calls to a plurality of Home Network endpoints as follows:
      establishing traffic channels to communicate information to the endpoints in the Home Network format; and
      establishing a control channel for managing the universal call-log; and,
   logging the bridged calls, forming a universal call-log that cross-references entries selected from the group including the call time, the call duration, the type of call, the external telephone line involved, the external telephone number from which an incoming call is received, the external telephone line telephone number to which an outgoing call is addressed, the endpoint to which an incoming call is addressed, and the endpoint initiating an outgoing call;
   wherein bridging incoming calls received on an external telephone line addressed to an endpoint includes:
      ringing a first endpoint and a second endpoint;
      answering the call at the first endpoint, but not the second endpoint; and,
      wherein forming a call-log further includes making an "answered call" entry for the first endpoint and "missed call" entry for the second endpoint.

2. The method of claim 1 wherein bridging calls to a plurality of Home Network endpoints includes initiating an outgoing call from an endpoint; and,
   wherein logging the bridged calls includes logging outgoing calls initiated from endpoints.

3. The method of claim 1 wherein bridging calls to a plurality of Home Network endpoints includes bridging incoming calls received on an external telephone line addressed to an endpoint; and,
   wherein logging the bridged calls includes logging incoming calls received on the external telephone lines addressed to one or more of the endpoints.

4. The method of claim 3 wherein bridging calls to a plurality of Home Network endpoints includes initiating an outgoing call from an endpoint; and, wherein logging the bridged calls including logging outgoing calls initiated from endpoints.

5. The method of claim 4 wherein initiating an outgoing call from an endpoint includes initiating a call from the first endpoint to the second endpoint; and,
wherein logging the bridged calls including logging calls between endpoints.

6. The method of claim 1 wherein logging the bridged calls includes using the gateway to from a centralized universal call-log to maintain entries for each endpoint.

7. The method of claim 6 wherein logging the bridged calls includes forming the universal call-log in nonvolatile gateway memory.

8. The method of claim 1 wherein transceiving calls on the at least one external telephone line includes receiving calling line ID (CLID) information to identify the telephone number of calling parties; and,
wherein logging the bridged calls includes logging the telephone numbers of calling parties in response to receiving the calling line ID information.

9. The method of claim 1 further comprising:
accessing the universal call-log from any of the plurality of endpoints.

10. The method of claim 1 wherein logging the type of call includes logging endpoint actions selected from the group including "missed", "answered", and "dialed" calls.

11. A The method of claim 9 further comprising:
forming a local call-log at each endpoint; and,
accessing the local call-log in response to an action selected from the group including manual selection by the user and the inaccessibility of the universal call-log.

12. The method of claim 1 further comprising:
accessing the universal call-log from an input/output (I/O) device connected to the gateway; and,
viewing the universal call-log using an I/O device interface selected from the group including a display and a printer.

13. The method of claim 12 further comprising:
using the I/O device to edit entries in the universal call-log.

14. The method of claim 13 further comprising:
saving a record of the universal call log at the I/O device.

15. The method of claim 12 further comprising:
using the I/O device to determine the size of the universal call-log, where the size is a measurement selected from the group including the number of entries and the total number of bytes.

16. The method of claim 12 further comprising:
establishing a call-log security protocol to enable access the universal call-log; and,
prior to accessing to the universal call-log, passing the security protocol.

17. The method of claim 12 further comprising:
in response to accessing the universal call-log, analyzing the call-log entries to create statistical summaries selected from the group of including the total number of calls, the average call length, and rankings by call length.

18. The method of claim 9 further comprising:
maintaining a phonebook cross-referencing descriptors to external telephone his telephone numbers;
accessing the phonebook; and,
identifying universal call-log entries using descriptors from the phonebook.

19. The method of claim 18 further comprising:
identifying endpoints in the call-log with a descriptor from the phonebook.

20. The method of claim 18 wherein maintaining a phonebook cross-referencing descriptors to external telephone line telephone numbers includes maintaining a phonebook at a destination selected from the group including a universal phonebook stored at the gateway and local phonebooks stored at each corresponding endpoint.

21. The method of claim 1 wherein logging the bridged calls includes:
forming a universal call-log with a predetermined fixed number of entries; and,
overwriting older entries with newer entries when the call-log entries exceed the fixed number.

22. The method of claim 1 wherein logging the bridged calls includes:
forming a predetermined time threshold; and,
discarding entries in the universal call-log having an age greater than the time threshold.

23. The method of claim 1 wherein establishing a control channel for communications with the universal call-log includes establishing an out-of-band control channel between the gateway and each endpoint to which a call is bridged.

24. The method of claim 9 wherein accessing the universal call-log from any of the plurality of endpoints includes:
communicating an uplink out-of-band message from an endpoint to the gateway specifying universal call-log search parameters; and,
communicating a downlink out-of-band message from the gateway to the endpoint returning the results of the universal call log search.

25. The method of claim 24 wherein communicating a downlink out-of-band message from the gateway to the endpoint includes returning at least one call-log entry cross-referenced to the selected search parameter.

26. The method of claim 25 wherein communicating an out-of-band message, from an endpoint to the gateway, with a search parameter includes communicating a search parameter fragment; and.
wherein communicating an out-of-band message, from the gateway to the endpoint, includes returning universal call-log entries comprised of the search parameter fragment.

27. The method of claim 25 wherein communicating an out-of-band message, from the endpoint to the gateway, with a search parameter includes entering one entry character per out-of-band message; and,
wherein communicating an out-of-band message, from the gateway to the endpoint, returning the results of the universal call-log search includes;
refining the list of entries in response to each received character; and,
returning the refined list of entries in every out-of-band message.

28. The method of claim 25 wherein communicating uplink and downlink messages further includes:
iteratively exchanging uplink and downlink out-of-band messages to refine the search; and,
using a display and an endpoint local interface to scroll through the cross-referenced entries in response to iterative communications between the endpoint and the gateway.

29. In a Home Network telephone system for maintaining a universal call-log, the system comprising:
a gateway having a port for transceiving calls on at least one external telephone line and a port for bridging calls, the gateway communicating call information on on the external telephone line in a first format and converting between the first format and a digital Home Network format, the gateway establishing traffic channels to communicate information to the endpoints in the Home Network format, and establishing a control channel for managing a universal call-log;

at least one endpoint having a port connected to the gateway for bridging initiated calls and calls addressed to the endpoint received on an external line;

a centralized universal call-log, integrally formed with the gate, logging the calls bridged between the gateway and each endpoint, the call-log cross-referencing entries selected from the group including the call time, the call duration, the type of call, the external telephone line involved, the external telephone number from which an incoming call is received, the external telephone line telephone number to which an outgoing call is addressed, the endpoint to which an incoming call is addressed, the endpoint initiating an outgoing call and endpoint actions selected from the group including answering a call addressed to an endpoint, missing a call addressed to an endpoint, and dialing a call from an endpoint;

wherein the gateway receives a call and rings a first and second endpoint;

wherein the first endpoint answers the call;

wherein the second endpoint does not answer the call; and, wherein the call-log makes an "answered call" entry for the first endpoint and "missed call" entry for the second endpoint.

30. The system of claim 29 wherein an endpoint initiates an outgoing call bridged to an external telephone line through the gateway; and, wherein the call-log logs the outgoing calls initiated from the endpoint.

31. The system of claim 29 wherein a first endpoint initiates a call bridged to a second endpoint through the gateway; and, wherein the call-log logs the call between the first and second endpoints.

32. The system of claim 29 wherein the gateway includes a nonvolatile memory; and, wherein the call-log resides in the gateway nonvolatile memory.

33. The system of claim 29 wherein the gateway receives calling line ID (CLID) information on the external telephone lines to identify the telephone number of calling parties; and, wherein the call-log the telephone numbers of calling parties in response to the gateway receiving the calling line ID information.

34. The system of claim 29 wherein each endpoint includes a local call-log that is used in response to action selected from the group including manual selection by the user and the event of the universal call-log being inaccessible.

35. The system of claim 29 further comprising:

an input/output (I/O) device having a port connected to the gateway for accessing and downloading the universal call-log and, an I/O device interface, selected from the group including a display and a printer, having a port connected to the I/O device for displaying the downloaded call-log.

36. The system of claim 35 wherein the I/O device has a user interface to accept user commands, the I/O device supplying the user commands in communications with call-log and, wherein the calling accepts the user commands from the I/O device and edits entries in the universal call-log in response to the user commands.

37. The system of claim 36 wherein the I/O device has a memory fir saving a copy of the downloaded call-log.

38. The system of claim 37 wherein the I/O device sends commands to query the size of the call-log; and, wherein the call-log supplies a call-log measurement in response to the query, where the measurement is selected from the group including the number of entries and the total number of bytes.

39. The system of claim 37 wherein the gateway further includes a sentry circuit having a port connected to the call-log, the sentry circuit establishing a call-log security protocol to enable access the universal call-log and blocking access to the universal call-log until the security protocol is passed.

40. The system of claim 37 wherein the I/O device includes a statistic, application, the I/O device using the statistics application to analyze the downloaded universal call-log, analyzing the call-log entries to create statistical summaries selected from the group of including the total number of calls, the average call length, and rankings by call length.

41. The system of claim 29 wherein the gateway further includes a phonebook having a port to supply descriptors cross-referenced to external telephone line telephone numbers; and, wherein the call log accesses the phonebook and identifies universal call-log entries using descriptors from the phonebook.

42. The system of claim 41 wherein the call-log identifies endpoint entries in the call-log with a descriptor from the phonebook.

43. The system of claim 41 wherein the phonebook is accessible from a source selected from the group including an endpoint and an input/output I/O device connected to the gateway.

44. The system of claim 41 wherein each endpoint includes a local phonebook cross referencing descriptors to external telephone line telephone numbers.

45. The system of claim 29 wherein the call-log is formed from a predetermined fixed number of entries the call-log overwriting the older entries with newer entries when the call-log entries exceed the fixed number.

46. The system of claim 29 wherein the call-log includes a clock for referencing a predetermined time threshold, the call-log discarding entries in the universal call-log with an age greater than the time threshold.

47. The system of claim 29 wherein the gateway establishes an out-of-band control channel between the gateway and each endpoint to which a call is bridged.

48. The system of claim 47 wherein an endpoint accesses the universal call-log by communicating an uplink out-of-band message to the gateway specifying universal call-log search parameters and, wherein the gateway communicates a downlink out-of-band message to the endpoint returning the results of the universal call-log search.

49. The system of claim 48 wherein the gateway communicates a downlink out-or-band message including at least one call-log entry cross-referenced to the selected search parameter.

50. The method of claim 49 wherein an endpoint communicates an out-of-band message to the gateway, with a search parameter fragment; and, wherein the gateway communicates an out-of-band message to the endpoint with entries from the universal call log including the search parameter fragment.

51. The method of claim 49 wherein an endpoint communicates an out-of-band message to the gateway, entering one entry character per out-of-band message; and, wherein the gateway communicates an out-of-band message to the endpoint refining the list of returned entries in response to each received character.

52. The system of the claim 50 wherein the gateway and endpoint iteratively exchange uplink and downlink out-of-band messages to refine the search; and, wherein the endpoint includes a display and a user interface to scroll through the cross-referenced entries in response to iterative communications between the endpoint and the gateway.

* * * * *